United States Patent [19]

Kwak

[11] Patent Number: 4,490,345
[45] Date of Patent: Dec. 25, 1984

[54] CONVERSION OF FS SMOKE AGENT (A MIXTURE OF SULFUR TRIOXIDE AND CHLOROSULFONIC ACID) TO SULFAMIC ACID AND AMMONIUM CHLORIDE

[75] Inventor: Solim S. W. Kwak, Orem, Utah

[73] Assignee: The United States of America as represented by the Secretary of the Army, Washington, D.C.

[21] Appl. No.: 586,155

[22] Filed: Mar. 5, 1984

[51] Int. Cl.$^3$ ............................................. C01B 17/00
[52] U.S. Cl. ..................................... 423/389; 423/470
[58] Field of Search ................................ 423/389, 470

[56] References Cited

U.S. PATENT DOCUMENTS

| 2,109,952 | 3/1938 | Wyler | 423/389 |
| 3,125,415 | 3/1964 | Gilbert et al. | 423/389 |

FOREIGN PATENT DOCUMENTS

| 748119 | 9/1970 | Belgium | 423/389 |
| 2909032 | 9/1980 | Fed. Rep. of Germany | 423/389 |
| 1585459 | 1/1970 | France | 423/389 |
| 789389 | 12/1980 | U.S.S.R. | 423/389 |

Primary Examiner—John Doll
Assistant Examiner—Wayne A. Langel
Attorney, Agent, or Firm—Anthony T. Lane; Robert P. Gibson; Robert O. Richardson

[57] ABSTRACT

The process of converting FS smoke agent (a mixture of sulfur trioxide and chlorosulfonic acid) to sulfamic acid and ammonium chloride comprising the steps of dissolving the FS smoke agent in an organic solvent solution to obtain a solvation product, subjecting the solvation product to ammonia gas to obtain a sulfamic acid ammonium chloride mix, and separating and purifying the mix into sulfamic acid and ammonium chloride.

8 Claims, 2 Drawing Figures

CONVERSION OF FS SMOKE AGENT (A MIXTURE OF SULFUR TRIOXIDE AND CHLOROSULFONIC ACID) TO SULFAMIC ACID AND AMMONIUM CHLORIDE

GOVERNMENT INTEREST

The invention described herein may be manufactured and/or used by or for the Government for governmental purposes without the payment of any royalty thereon.

BACKGROUND OF THE INVENTION

FS smoke agent is used by the military to hide tanks and troops from the enemy. FS smoke agent is currently being stored in metal containers which are deteriorating. Visual inspection will show that the FS smoke agent is a viscous black fuming liquid when it is contaminated with corrosion. There exists, therefore, an urgent requirement for the development of an ecologically safe method for demilitarization of the bulk FM smoke agent.

FS smoke agent is a non-combustible screening smoke consisting of a mixture of sulfur trioxide, $SO_3$, and chlorosulfonic acid, $CLSO_3H$. The standard solution of FS smoke agent for military use consists of 55 percent sulfur trioxide and 45 percent chlorosulfonic acid by weight. Liquid FS smoke agent has a density of 1.9, about the same as sulfur trioxide, and it decomposes when heated to 80° C. (176° F.). When exposed to moist air, the agent reacts vigorously with the moisture, decomposing into aqueous hydrochloric acid, $HCL(l)$, and sulfuric acid, $H_2SO_4(l)$. Contact of liquid agent with skin can cause severe chemical burns. FS smoke vapor causes irritation of the throat and eyes, a feeling of constriction around the chest, and a prickling sensation on the skin.

Sulfur trioxide is a planar, triagonal, and symmetrical molecule in which the three S—O bonds are exactly alike. These bonds are resonance hybrids with one and one-half bonds each. Upon hydration, amination, or hydrochlorination, sulfur trioxide converts from a planar structure to products with near-tetrahedral bonding structures. Chlorosulfonic acid, $CLSO_3H$, has a similar molecular structure; a tetrahedron with one of the OH groups now replaced with CL. Liquid sulfur trioxide and chlorosulfonic acid have boiling points of 44.8° C. (112.6° F.) and 158° C. (316.4° F.) respectively, but FS smoke agent decomposes at a temperature of 80° C. (176° F.). This behavior of the agent indicates that the mixture of sulfur trioxide and chlorosulfonic acid is not a simple solution, but rather that the mixture has a stable bonded structure, either by complexation or by weak covalent bonding.

FS smoke agent is a liquid at room temperature. When pure, the solution is a viscous pale yellow fluid with a strong acrid odor. Dry FS smoke agent is stable when stored in metal containers; however, the agent vigorously corrodes metals in the presence of even very minute amounts of moisture. When in contact with water, FS smoke agent reacts violently, generating large amounts of heat. Although it is not combustible itself, it can be a fire hazard in the presence of other materials which are combustible.

When FS smoke agent is atomized in the air, the sulfur trioxide quickly evaporates from the droplets of agent, and reacts with moisture in the air to form sulfuric acid vapor. The sulfuric acid vapor condenses to produce smoke particles. Water vapor in the air is the primary factor affecting the evaporation of sulfur trioxide from FS smoke agent. The absorbtion of moisture by FS smoke agent generates heat, and the heat causes the sulfur trioxide to evaporate further. The water vapor concentration in the air, therefore, determines the rate of evaporation and the total quantity of sulfur trioxide being evaporated.

Based on the facts presented here, it may be concluded that FS smoke agent does not manifest the characteristic behavior of either of its component compounds, and that it must be considered as a unique chemical mixture. For the above reasons conventional disposal methods are inadequate and unsafe in the disposal of FS smoke agent.

SUMMARY OF THE INVENTION

FS smoke agent is currently being stored in metal containers which are deteriorating.

An ecologically safe and practical demilitarization method was developed, in accordance with the present invention, for converting FS smoke agent to sulfamic acid and to other related chemicals, first by solvation of the FS smoke agent in organic solvent, and then ammonolysis of the resultant solution.

Through this method, difficult problems of reaction heat control, reaction rate control, and safe handling associated with demilitarization and disposal of FS smoke agent are successfully resolved.

The solvation/ammonolysis method of the present invention carries out the conversion process at a relatively low temperature, with the continuous reuse of solvent. A yield of 50–91 percent conversion to sulfamic acid, the major product has been achieved.

Continuous solvation/ammonolysis demilitarization of the FS smoke agent has been developed in an economical manner. The chemical expression for the conversion is:

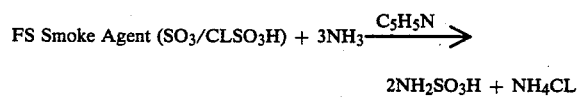

$$FS\ Smoke\ Agent\ (SO_3/CLSO_3H) + 3NH_3 \xrightarrow{C_5H_5N}$$

$$2NH_2SO_3H + NH_4CL$$

Where $SO_3$ is sulfur trioxide, $CLSO_3H$ is chlorosulfonic acid, $NH_3$ is ammonia gas, $C_5H_5N$ is pryidine solvent, $NH_2SO_3H$ is sulfamic acid, and $NH_4CL$ is ammonium chloride.

DESCRIPTION OF PREFERRED EMBODIMENTS

In the practice of the present invention the first step is solvation of the FS smoke agent in organic solvent. This causes dilution of the FS smoke agent in the solvent to produce a stable intermediate composition. This intermediate composition further reacts in the second step with ammonia in situ to produce a major final product, sulfamic acid, and a by-product, ammonium chloride.

Figure 1:
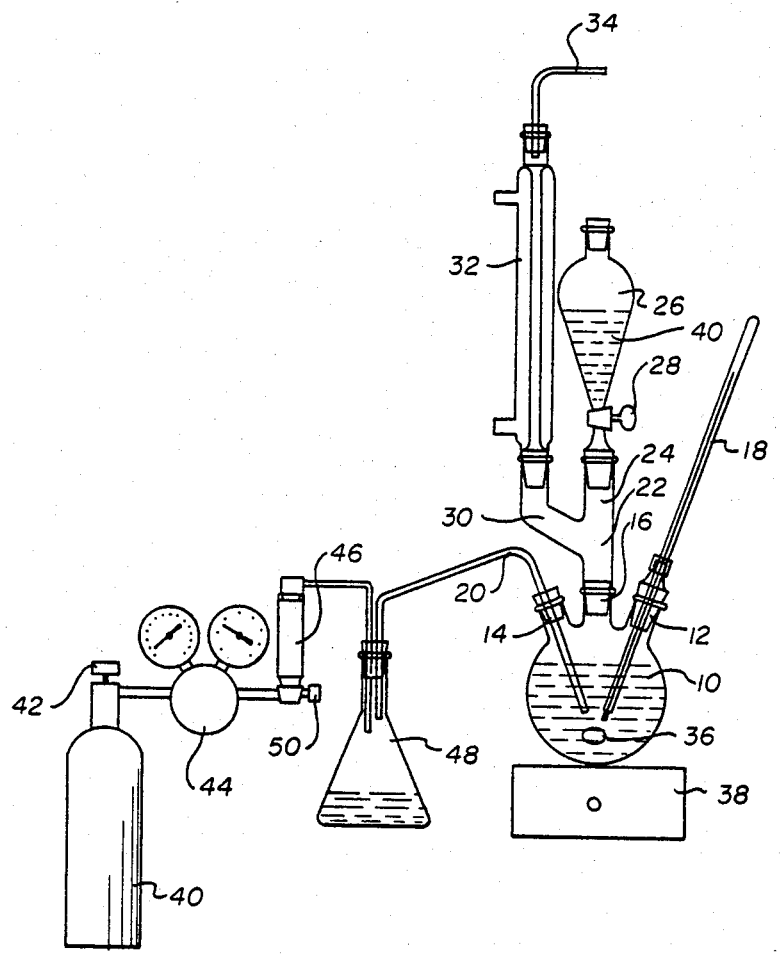
FIG. 1 is a schematic representation of a laboratory batch process for converting FS smoke agent to sulfamic acid and ammonium chlroide by solvation/ammonolysis.

The solvation step is accomplished by placing 500 ml of organic solvent, pyridine 8, in a 1000 ml three neck reaction flask 10 shown in FIG. 1. Pyridine was chosen as the preferred solvent from a group consisting of:

1,2-dichloroethane,
1,1-dichloroethane,
1,1,2,2-tetrachloroethane,
Dichloromethane
Carbontetrachloride,
Pyridine,
Dimethylsulfoxide,
Hexane, and
Toluene.

All of these are clear liquids. Although all of the group functioned satisfactorily, pyridine was preferred because it had a relatively high boiling point, good solvating properties with respect to the FS smoke agent, good chemical and thermal stability in the presence of the FS smoke agent, and good chemical stability in the presence of ammonia gas which is added in the second step.

Flask 10 has three necks 12, 14, and 16 for retention of a thermometer 18, ammonia gas injection port 20, and separator 22, This separator has a first neck 24 through which the FS smoke agent in agent addition funnel 26 is metered in by stop cock 28. The second neck 30 on separator 22 has a water cooled condenser 32 to condense the reaction vapors for return to the reactor 10. Exit 34 is for excess ammonia gas (which does not condense) escape when ammonia gas is added in the second step. Flask 10 is also equipped with a magnetic stirring bar 36 and its actuator 38. Funnel 26 is filled with 100 ml of FS smoke agent 40.

While the pyridine 8 is being stirred, by opening stop cock 28, the FS smoke agent is allowed to flow slowly into the reactor 10. If added too rapidly some of the black corroded smoke agent will cling to the wall of flask 10. This flow continues until the funnel 26 is exhausted of the smoke agent. The dissolved intermediate solvation composition on 100 ml FS smoke agent in 500 ml of pyridine now has a yellow color which indicates the solvation reaction is complete. It has been found that the above ratio of smoke agent to solvent is not critical so long as there is an excess of pyridine.

The second step of this invention is the ammonolysis or ammination of the intermediate composition that was produced in step one. Here an ammonia gas tank 40 is connected to the gas injection port 20 through a valve 42, gas regulator 44, flow meter 46, and trap 48. This step commences by opening valve 42, adjusting regulator valve 44 to about 10–15 psi. The flow rate of ammonia gas into reactor 10 is regulated by adjusting flow meter valve 50 so that the flow rate is about 0.5 ml/sec. The purpose of the trap 48 is to prevent reverse flow of smoke agent in reactor 10 to contaminate the ammonia gas flow regulator apparatus 44, 46, and 50. The ammonia gas flow rate and pressure should be adjusted such that the excess ammonia gas in reactor 10 would bubble through the solution of the intermediate composition and be expelled through exhaust port 34. This process is continued for 10 to 20 minutes. The progress of the reaction is detected by noticing the formation of final product, a slurry of sulfamic acid white powder particles suspended in solution. As the reaction progresses the fine powder particles begin to coagulate into larger particles, after which the ammonolysis process is continued for another 10 minutes to insure that the reaction is completed. When completed, valves 50, 44, and 42 are closed in that order and the reacted material is removed from reactor 10 and moved to a filtration apparatus (not shown) where the solid products and the solvent are separated by usual filtration techniques. The solid product is removed from the filtration apparatus and air dried. This product is a mixture of sulfamic acid, the major product, and ammonium chloride, a by-product. Separation of these products may be done by conventional methods such as by recrystallization techniques for example. The solvent recovered is returned to the reactor 10 for reuse. After the ammonium chloride and sulfamic acid are separated, the ammonium chloride can be used as fertilizer.

Sulfamic acid is a white, crystalline, non-hygroscopic solid. It is one of the few strong monoprotic acids which can be weighed without requiring special drying preparations. The melting point of sulfamic acid is 200° C. Forty-seven grams of sulfamic acid will dissolve in 100 grams of hot water at 60° C. while only 14 grams will dissolve in cold water. Sulfamic acid is used in the following applications:

a. Metal and ceramic cleaning.
b. Nitrite removal in azo dye operations.
c. Gas liberating composition.
d. Organic syntheses.
e. Analytical acidimetric standard.
f. Plasticizer.
g. Fire retardant.
h. Stabilizing agent for chlorine and hypochlorite in swimming pools.
i. Bleaching paper pulp and textiles.
j. Catalyst for urea-formaldehyde resins.
k. Sulfonation agent.
l. pH control.
m. Hard water scale removal.
n. Electroplating.

Figure 2:
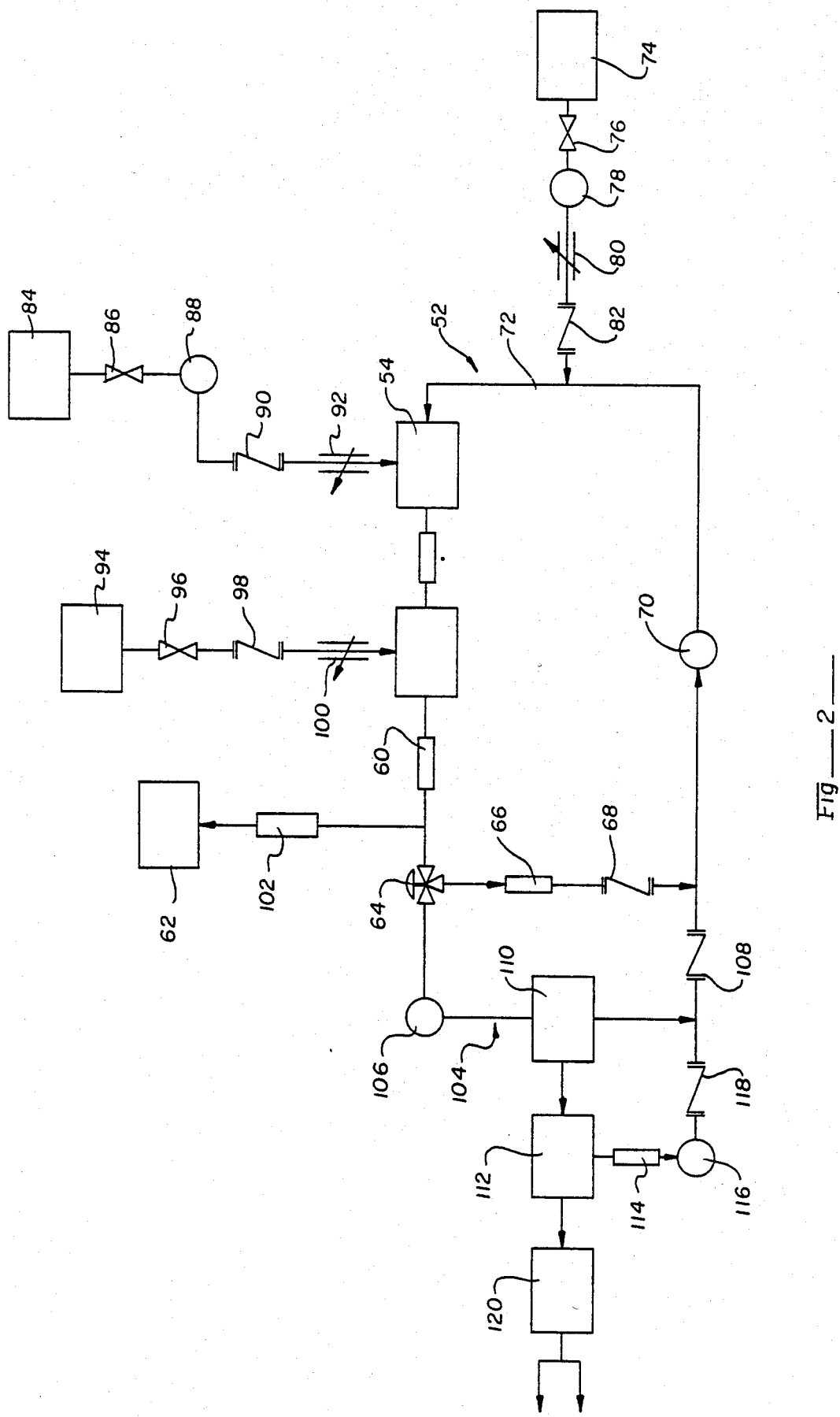
FIG. 2 is a schematic representation of a continuous process for converting the same.

Reference is now made to the schematic representation of the continuous process in FIG. 2 for converting FS smoke agent to sulfamic acid and ammonium chloride by solvation/ammonolysis. Briefly, the apparatus shown performs the 7 steps of (1) adding pyridine or other solvent to the reaction circulation loop system, (2) adding FS smoke agent to the circulating solvent, (3) injection of ammonia gas to the solution of FS smoke agent and solvent, (4) removal of solid products from the circulating slurry in the extraction loop by solid-liquid separation techniques, (5) recycling of pyridine or other solvent for continuous operation, (6) drying the solid products to powder form, and (7) purification of products by recrystallization techniques.

In FIG. 2 there is shown a reaction circulation loop 52 consisting of a solvation reactor 54, ammonolysis reactor 56, heat exchangers 58 and 60, vent 62, three way flow control valve 64, view port 66, check valve 68, and circulation pump 70. These are all connected as shown by appropriate transporting pipes 72. A solvent tank 74 is connected to the loop 52 by means of a valve 76, metering pump 78, flow regulator valve 80, and check valve 82. An FS smoke agent tank 84 is connected to the solvation reactor 54 by means of a valve 86, metering pump 88, check valve 90, and flow regulator valve 92. An ammonia gas tank 94 is connected to the ammonolysis reactor 56 by means of a valve 96, check valve 98, and flow regulator valve 100. Vent 62 is connected to the loop 52 through a condenser 102 to prevent excess pressure buildup in the loop. A view port 66 in the loop permits visual observance of the progress of the reaction within the loop. (The solvent is clear, the smoke agent is black, the solvation product is yellow, and the ammonolysis product is a white powder suspended in solvent as a slurry.) Check valve 68 in the loop prevents reverse flow.

The extraction loop 104 is a secondary loop attached to the primary reaction circulation loop 52. It consists of a circulation pump 106, check valve 108, and a solid-liquid separator 110. Attached to the separator 110 is a dryer apparatus 112. A solvent recovery condenser 114, solvent return pump 116, and check valve 118 returns recovered solvent from dryer 112 back to the main reaction circulation loop 52. The purification/separation of the dried product follows the drying process and is identified as 120.

In commencing the continuous conversion process depicted in FIG. 2, solvent is first released from tank 74 and is circulated through the reaction circulation loop 52. Next the FS smoke agent from tank 84 is added to the solvation reactor 54 where the agent is solvated in pryidine solvent. A visual check from view port 66 will show a yellow solution when it is properly solvated. Ammonia gas from tank 94 is then added to the ammonolysis reactor 56. A visual inspection from view port 66 will show white powdered particles suspended in the circulating solution indicating the extent of the conversion reaction. At this time the three way flow control valve 64 is opened and a portion of circulating solution is allowed to flow through the secondary extraction loop where the solid particles or product is removed in separator 110 and passed to dryer 112. The remaining liquid or solvent is returned to the main reaction circulation loop 52 for reuse.

The dryer 112 further removes the residual solvent from the solid product. It is condensed and returned to the main loop 52 for reuse. From the dryer the next step is to separate and purify the components (sulfamic acid and ammonium chloride) of the dried solid product by an appropriate separation technique such as recrystallization 120, for example.

The invention in its broader aspects is not limited to the specific combinations, improvements, and instrumentalities described but departures may be made therefrom within the scope of the accompanying claims without departing from the principles of the invention and without sacrificing its chief advantages.

What I claim is:

1. The process of converting FS smoke agent (a mixture of sulfur trioxide and chlorosulfonic acid) to sulfamic acid and ammonium chloride comprising the steps of:
   a. dissolving FS smoke agent into an organic solvent solution to obtain a solvation product,
   b. subjecting said solvation product with ammonia gas to obtain a sulfamic acid and ammonium chloride mix,
   c. separating and purifying said mix into sulfamic acid and ammonium chloride.

2. The process as set forth in claim 1 wherein said solvation product is a termally stable intermediate composition which remains dissolved in said solvent solution.

3. The process as set forth in claim 1 wherein the solvent solution is one from a class consisting of:
   1,2-dichloroethane,
   1,1-dichloroethane,
   1,1,2,2-tetrachloroethane,
   Dichloromethane,
   Carbontetrachloride,
   Pyridine,
   Dimethylsulfoxide,
   Hexane, and
   Toluene.

4. The process as set forth in claim 1 wherein the solvent solution is pyridine.

5. The process as set forth in claim 1 wherein said FS smoke agent is added while said solvent is continuously stirred until the resultant solvation product is a yellow liquid.

6. The process as set forth in claim 1 wherein said ammonia gas is added while the resultant white participate is continually removed from said solvation product.

7. The process as set forth in claim 1 wherein said mix is separated and purified by recrystallization techniques.

8. The process as set forth in claim 1 wherein said mix is filtered and the liquid removed therefrom and reused in subsequent solvation of additional FS smoke agent.

* * * * *